United States Patent [19]

Broberg et al.

[11] Patent Number: 4,829,223
[45] Date of Patent: May 9, 1989

[54] VEHICLE BATTERY CHARGER

[76] Inventors: Daniel M. Broberg, 4111 Coffman La., Minneapolis, Minn. 55406; Terry A. Prentice, 9914 Fremont Ave., S. Bloomington, Minn. 55444

[21] Appl. No.: 147,510

[22] Filed: Jan. 25, 1988

[51] Int. Cl.$^4$ .............................................. H02J 7/00
[52] U.S. Cl. .......................................... 320/2; 320/54; 320/25
[58] Field of Search ................ 320/2, 54, 57, 25, 26

[56] References Cited

U.S. PATENT DOCUMENTS

| | | |
|---|---|---|
| 3,409,816 | 11/1968 | Foster .................................. 320/57 |
| 3,596,018 | 7/1971 | Elmes ................................ 320/2 X |
| 3,603,860 | 9/1971 | Johnson ................................ 320/2 |
| 3,904,947 | 9/1975 | Crews .................................... 320/2 |

Primary Examiner—R. J. Hickey
Attorney, Agent, or Firm—Leo Gregory

[57] ABSTRACT

A vehicle battery harness including a battery charger having a cable permanently attached to the electrical or battery system of a storage battery equipped vehicle, the cable having a terminal which can only be connected in a correct polarity with the battery charger for a safe connection to charge the battery of the vehicle.

3 Claims, 1 Drawing Sheet

VEHICLE BATTERY CHARGER

BACKGROUND OF THE INVENTION

1. Field of Invention

This invention relates to an installed battery wiring harness and a related battery charger.

2. Description of the Prior Art

The invention herein relates to a cable harness installed in a motorized vehicle embodying the use of a storage battery or electrical system and more particularily relates to safe accessability to the battery.

Exasperating inconvenience is experienced in finding a battery run down in attempting to start a vehicle. A good deal of delay is experienced in seeking a service to give the battery a charge. Certain danger exists in hooking up a jumper cable having the conventional alligator clamps for connection. An incorrect polarity connection can result in creating sparks and the risk of a battery explosion is ever present.

In U.S. Pat. Nos. 4,006,452 to Puckett and 3,466,453 to Greenberg there are disclosed jumper cables available, in the former in a service vehicle and the latter in the trunk of a vehicle, the latter having a special terminal for connection to a battery circuit or to an alternator circuit.

In U.S. Pat. No. 4,157,492 to Colbrese, a cable connection member is provided to receive cable terminals for contact with the electrical system of a vehicle and the connection member is stored under the hood of the vehicle.

SUMMARY OF THE INVENTION

The invention herein relates to a safe and convenient hook up of a cable with a battery connection with an automotive vehicle for a start up of the vehicle when the battery is run down.

It is an object of this invention to provide a cable harness to be hooked up as a permanent under hood installation either to the battery or to the electrical system of an automotive vehicle without need to raise the hood for connection with the cable.

It is a further object to provide in connection with an installed cable harness in a vehicle, a battery charger having a permanently attached cable thereto, the cables of said battery charger and of said vehicle being connectable only in a manner which assures a correct polarity.

Referring to the previous object, connection with said cable is provided with a shielded terminal which extends through the grill of the vehicle.

It is also within the scope of the invention herein to provide a permanently installed cable harness for battery powered vehicles wherein there is convenient accessability to the cable harness terminal for the purpose of charging the battery, an example of such vehicles being, an electrical golf cart.

These and other objects and advantages of the invention will be set forth in the following description made in connection with the accompanying drawings in which like reference characters refer to similar parts throughout the several views.

DESCRIPTION OF A PREFERRED EMBODIMENT

Figure 1:
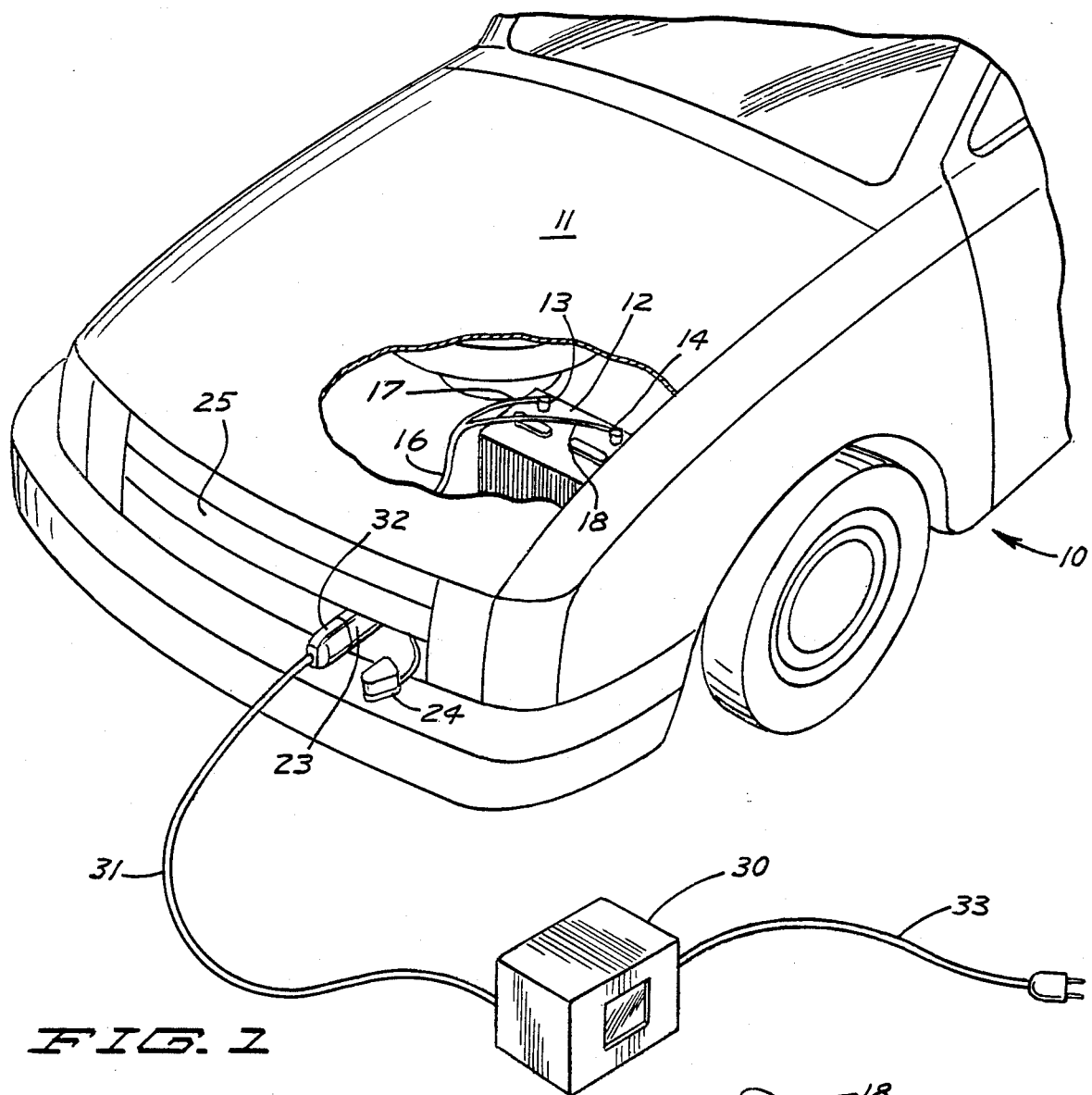
FIG. 1 is a perspective view showing the invention in an operating position with a portion thereof being broken away.

Referring to the Figs. an automotive vehicle 10 is shown having a portion of the hood 11 broken away to disclose a battery 12 and the terminals or posts 13 and 14 thereof.

Connected to said battery is a wiring harness or cable 16 having at one end thereof terminals 17 and 18 connected in a conventional manner to the battery posts 13 and 14. Said cable terminals are shown as ring terminals in FIG. 2 and the same will be color coded or otherwise marked as being positive and negative respectively, although not so here indicated.

The battery posts are equipped with conventional cap nuts to secure the terminals, said nuts are not here indicated.

Although said cable 16 is shown harnessed to the battery 12, said cable, for purposes herein, may be connected in other ways to the electrical system of the vehicle. The positive terminal of the cable 16 could be attached to the voltage regulator or to the starter of the vehicle and the grounded location to which the other terminal could be attached would be to the chassis of the vehicle or to its engine block.

The other or outer end of said cable terminates in a polarized female plug 23 which is secured in a convenient manner extending outwardly of the grill 25. Said plug has an end weather cap 24 tethered on a retention cable 26. Said weather cap is received onto plug 23 overlying the rim portion 23d thereof to provide a weather seal.

In FIG. 1, a battery charger 30 is shown having one cable 31 having a terminal 32 plugged into the terminal 23 and having its other cable 33 to be plugged into a power source to energize the battery charger to charge the battery of the vehicle.

The purpose here is to charge the vehicle battery 12, the polarized plug 23 will only permit a connection with the terminal 32 or another like terminal in a manner to assure a correct polarity at the connection.

The purpose and use of the cable 16 is what readily may be regarded as an essential convenience with the built-in safety of always being connected to a battery with a correct polarity without having to give the polarity a second thought or to be knowledgable about polarity.

Cables in general are used infrequently and are seldom at hand when required. The invention herein provies a permanent installation which does not require the lifting of the hood and the terminals are correctly polarized for charging the battery of the vehicle.

During cold months, or during vehicle storage it is not uncommon to use a trickle charger to keep the battery of the vehicle fully charged. Here a trickle charge is readily connected to the external plug 23.

Figure 2:
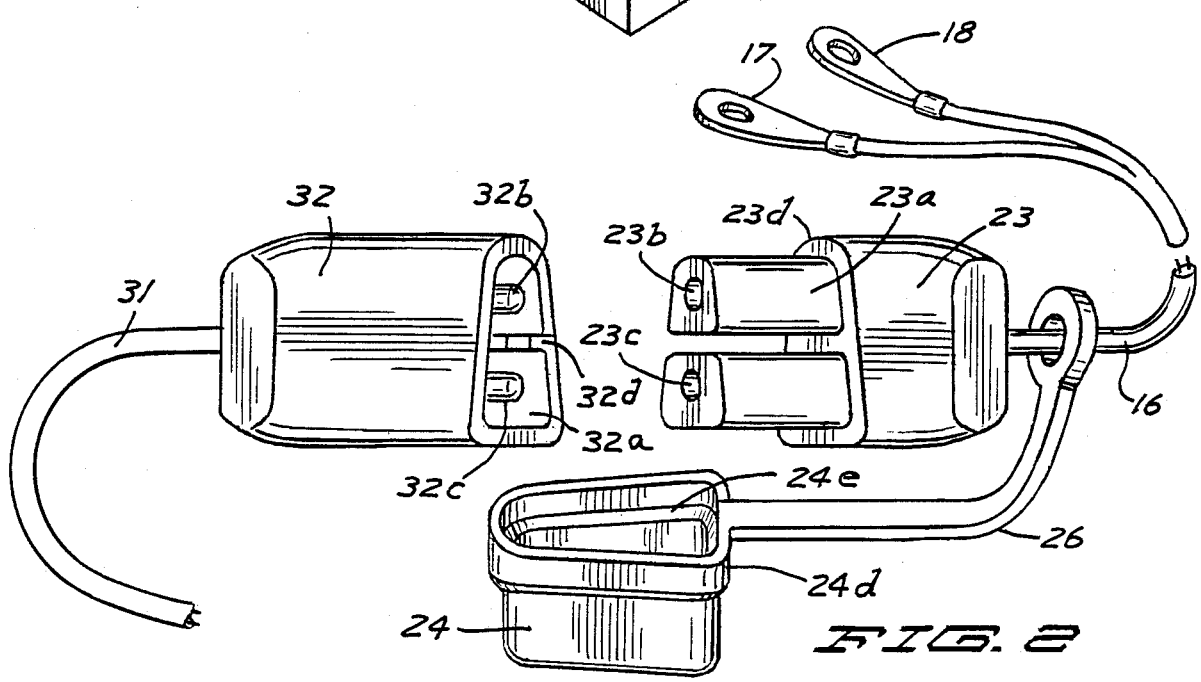
FIG. 2 is a broken view partially in elevation and partially in perspective showing details of the structure of the invention.

It will be noted that the terminals, exposed to the weather generally, as illustrated by the terminals 23-24 in FIG. 2, are well hooded and protected.

The recess of the terminal 23 is shown to be triangular in vertical section requiring a like mating terminal which can be received in a correct polarity.

The weather cap 24 has an annular rim 24d thereabout having an annular recess 24e therein to receive the rim portion 23d of said terminal 23.

The male plug or terminal 32 which is the counterpart of mating part of the terminal 23 has a recess 32a hooding the prongs 32b and 32c therein having a web 32d therebetween, said prongs to be received within the recessed projections 23b and 23c of said female terminal 23, said recessed projections having female contacts within the recesses to engage said prongs, the female contacts are not here shown.

Although described in connection with a vehicle powered by an internal combustion engine, the cable harness as arranged and described herein is applicable to other battery equipped vehicles which may require a battery for engine starting purposes or which may be battery powered vehicles such as golf carts.

It will of course be understood that various changes may be made in form, details, arrangement and proportions of the product without departing form the scope of applicant's invention which, generally stated, consists in a product capable of carrying out the objects above set forth, such as disclosed and defined in the appended claims.

What is claimed is:

1. In a vehicle equipped with an electrical storage battery, a charging apparatus consisting of,
    a first cable disposed under the hood of the vehicle,
    a first terminal of said first cable connected to the electrical system of said vehicle,
    a polarized non-symmetrical second terminal of said first cable extending outwardly of the grill of said vehicle,
    a battery charger,
    a second cable attached to said battery charger,
    a terminal of said second cable configured to be connectable with said second terminal of said first cable only in a correct polarity, and
    a third cable from said battery charger for connection with a power source.

2. The structure of claim 1, wherein
    said second terminal of said first cable comprises a female plug embodying spaced projections with each projection having a recess therein in which female electrical contacts are disposed,
    said projections taken together define a non-symmetrical configuration,
    said terminal of said second cable having a cross-sectional configuration corresponding to that of said projections of said female plug.

3. The structure of claim 2, wherein
    said terminal of said second cable has a web therein, and
    said projections of said second terminal of said first cable receives said web therebetween.

* * * * *